(12) United States Patent
Terrones et al.

(10) Patent No.: US 11,958,038 B2
(45) Date of Patent: Apr. 16, 2024

(54) REDUCTIVE BORON NITRIDE WITH EXTENDED REACTIVE VACANCIES FOR CATALYTIC APPLICATIONS

(71) Applicants: THE PENN STATE RESEARCH FOUNDATION, University Park, PA (US); SHINSHU UNIVERSITY, Nagano (JP)

(72) Inventors: Mauricio Terrones, State College, PA (US); Yu Lei, State College, PA (US); He Liu, State College, PA (US); Kazunori Fujisawa, State College, PA (US); Ana Laura Elias Arriaga, State College, PA (US); Tianyi Zhang, State College, PA (US); Rodolfo Cruz-Silva, Nagano (JP); Morinobu Endo, Nagano (JP); Xiaoxing Wang, State College, PA (US); Cynthia Guerrero-Bermea, Sabinas (MX)

(73) Assignee: The Penn State Research Foundation, University Park, PA (US)

( * ) Notice: Subject to any disclaimer, the term of this patent is extended or adjusted under 35 U.S.C. 154(b) by 275 days.

(21) Appl. No.: 17/304,004

(22) Filed: Jun. 11, 2021

(65) Prior Publication Data
US 2021/0370271 A1 Dec. 2, 2021

Related U.S. Application Data

(63) Continuation-in-part of application No. PCT/US2019/066193, filed on Dec. 13, 2019.

(60) Provisional application No. 62/779,544, filed on Dec. 14, 2018.

(51) Int. Cl.
| | |
|---|---|
| C01B 21/064 | (2006.01) |
| B01J 21/02 | (2006.01) |
| B01J 23/50 | (2006.01) |
| B01J 23/89 | (2006.01) |
| B01J 35/02 | (2006.01) |
| B01J 35/10 | (2006.01) |
| B01J 37/00 | (2006.01) |
| B01J 37/04 | (2006.01) |
| B01J 37/06 | (2006.01) |
| C25B 1/02 | (2006.01) |
| C25B 11/097 | (2021.01) |

(52) U.S. Cl.
CPC .............. *B01J 21/02* (2013.01); *B01J 23/50* (2013.01); *B01J 23/8926* (2013.01); *B01J 35/026* (2013.01); *B01J 35/1014* (2013.01); *B01J 37/0063* (2013.01); *B01J 37/009* (2013.01); *B01J 37/04* (2013.01); *B01J 37/06* (2013.01); *C01B 21/0648* (2013.01); *C25B 1/02* (2013.01); *C25B 11/097* (2021.01); *C01P 2002/72* (2013.01); *C01P 2002/82* (2013.01); *C01P 2002/84* (2013.01); *C01P 2004/04* (2013.01); *C01P 2006/37* (2013.01); *C01P 2006/40* (2013.01)

(58) Field of Classification Search
CPC ........ B01J 21/02; B01J 23/50; B01J 23/8926; B01J 35/026; B01J 35/1014; B01J 37/04; B01J 37/06; B01J 37/009; B01J 37/0063; B01J 37/0036; C01B 21/0648; C01B 32/21; C25B 1/02; C25B 11/097; C01P 2002/72; C01P 2002/82; C01P 2002/84; C01P 2004/01; C01P 2004/04; C01P 2004/20; C01P 2006/37; C01P 2006/40; C01G 39/02; C01G 41/00
USPC .......................... 423/289, 290; 502/200, 439
See application file for complete search history.

(56) References Cited

U.S. PATENT DOCUMENTS

2016/0276056 A1  9/2016  Stolyarov et al.

OTHER PUBLICATIONS

Fu et al., "In-situ growth of metal nanoparticles on boron nitride nanosheets as highly efficient catalysts", Journal of Materials Chemistry A, 2016, 4(48), pp. 19107-19115, The Royal Society of Chemistry 2016.
Zhao et al., "Single Mo atom Supported on Defective Boron Nitride Monolayer as an Efficient Electrocatalyst for Nitrogen Fixation: A Computational Study", J. Am. Chem. Soc., 2017,139, 12480-12487 and Supporting information pp. S1-S79.
Tran et al., "Quantum emission from hexagonal boron nitride monolayers", Nat. Nanotechnol., 2016, 11(1): pp. 37-41.
Lu et al., "Pd1/BN as a promising single atom catalyst of CO oxidation: a dispersion-corrected density functional theory study", Royal Society of Chemistry Advances, 2015, pp. 1-16.
International Search Report and Written Opinion for PCT/US2019/066193 filed Dec. 13, 2019 dated Mar. 9, 2020.
International Preliminary Report on Patentability for PCT/US2019/066193 filed Dec. 13, 2019 dated Jun. 8, 2021.

*Primary Examiner* — Elizabeth D Wood
(74) *Attorney, Agent, or Firm* — Buchanan Ingersoll & Rooney PC

(57) ABSTRACT

A group of reductive 2D materials (R2D) with extended reactive vacancies and a method for making the R2D with extended reactive vacancies are provided, especially the example of the reductive boron nitride (RBN). To create defects such as vacancies, boron nitride (BN) powders are milled at cryogenic temperatures. Vacancies are produced by milling, and the vacancies can be used to reduce various metal nanostructures on RBN. Due to the thermal stability of the RBN and the enhanced catalytic performance of metal nanostructures, RBN-metals can be used for different catalysts, including electrochemical catalysts and high temperature catalysts.

21 Claims, 17 Drawing Sheets

REDUCTIVE BORON NITRIDE WITH EXTENDED REACTIVE VACANCIES FOR CATALYTIC APPLICATIONS

CROSS-REFERENCE TO RELATED APPLICATIONS

This application is a continuation-in-part of PCT International Patent Application No. PCT/US2019/066193, filed on Dec. 13, 2019, which claims the benefit of U.S. Provisional Patent Application No. 62/779,544, filed on Dec. 14, 2018, which is incorporated by reference in its entirety.

BACKGROUND OF THE INVENTION

Field of the Invention

The present invention relates to catalytic materials that use reductive boron nitride.

Background of the Related Art

Reductive two-dimensional (2D) material is a type of 2D materials with chemical reactive sites generated by cryomilling. For example, reductive boron nitride (RBN) is a defective hexagonal boron nitride (hBN) with chemical reactive sites that are randomly distributed on the surface and are capable of reducing metal compounds to their lower oxidation states including but not limited to metallic clusters and single atoms. Although hBN itself is rarely considered as a promising catalyst, its excellent chemical stability, high thermal conductivity, and large band gap of 5.5 eV make it a strong candidate as a catalyst support under various harsh conditions (e.g., high temperature, acid, and base). (Uosaki, K. et al. "Boron Nitride Nanosheet on Gold as an Electrocatalyst for Oxygen Reduction Reaction: Theoretical Suggestion and Experimental Proof," *J. Am. Chem. Soc.* 136, 6542-6545, doi:10.1021/ja500393g (2014).) By introducing defects such as vacancies and hetero-atoms, hBN can be activated into RBN so that the optical bandgap is reduced to ~1.9 eV and various defect levels are created within the forbidden gap. (Tran, T. T., et al., "Quantum emission from hexagonal boron nitride monolayers," *Nat. Nanotechnol.* 11, 37-+, doi:10.1038/nnano.2015.242 (2016); Weng, Q. H. et al. "Tuning of the Optical, Electronic, and Magnetic Properties of Boron Nitride Nanosheets with Oxygen Doping and Functionalization," *Adv. Mater.* 29, doi:10.1002/adma.201700695 (2017). Attaccalite, C., et al., "Coupling of excitons and defect states in boron-nitride nanostructures," *Phys. Rev. B* 83, 7, doi:10.1103/PhysRevB.83.144115 (2011). The changes in the band structure in RBN allows the charge transfer between BN and metal cations to happen so that metal cations can be spontaneously reduced at the BN surface. (Sun, Y. G., "Metal Nanoplates on Semiconductor Substrates," *Advanced Functional Materials* 20, 3646-3657, doi:10.1002/adfm.201001336 (2010)). In addition, theoretical calculations have demonstrated that vacancy-defects such as B-, N-, B+V vacancies are favorable sites for metal (Pt, Ni, Ag) nucleation, which results in a robust bond between the reduced metal and the support at the vacancy-rich area. (Xu, D., et al., "Theoretical Study of the Deposition of Pt Clusters on Defective Hexagonal Boron Nitride (h-BN) Sheets: Morphologies, Electronic Structures, and Interactions with 0," *J. Phys. Chem. C* 118, 8868-8876, doi:10.1021/jp4087943 (2014); Lu, Z. S. et al. "A promising single atom catalyst for CO oxidation: Ag on boron vacancies of h-BN sheets," *Phys. Chem. Chem. Phys.* 19, 16795-16805, doi:10.1039/c7cp02430d (2017); Preobrajenski, A. B. et al., "Adsorption-induced gap states of h-BN on metal surfaces," *Phys. Rev. B* 77, 5, doi:10.1103/PhysRevB.77.085421 (2008)). Furthermore, due to the inertness of defect-free BN regions, the growth of the metal is confined near the defects, giving rise to the formation of the single metal atom and subnanoclusters without migration and aggregation.

BRIEF SUMMARY OF THE INVENTION

One aspect of the present invention is directed to a reductive boron nitride (RBN). RBN is a defective hexagonal boron nitride with chemical reactive sites that are randomly distributed on its surface. The chemical reactive sites are configured for reducing metal compounds and single metal atoms to their lower oxidation states.

In one embodiment, the metal compounds are metallic clusters. In some embodiments the metallic clusters include platinum, gold, silver, palladium, iron, cobalt, nickel, and/or combinations thereof.

In another embodiment, the chemical reactive sites are lattice imperfections.

In another embodiment, the lattice imperfections are extended reactive vacancies, reactive edges and other distortions.

In another embodiment, the chemical reactive sites have reactive edges and the average lateral size of the reactive edges is from 400 μm to 10 micrometers.

In another embodiment, the chemical reactive sites have extended reactive vacancies and the average diameter of the extended reactive vacancies is from 170 μm to 50 nm.

In another embodiment, the chemical reactive sites have extended reactive vacancies, and the extended reactive vacancies are configured for reducing the bandgap of hexagonal boron nitride (hBN) from insulating boron nitride (BN) to semiconducting RBN.

In another embodiment, the bandgap of the insulating BN is from 5 to 6 eV, and the bandgap of the semiconducting RBN is from 0.1 to 4.99 eV.

In another embodiment, the chemical reactive sites have extended reactive vacancies, and the extended reactive vacancies are configured for emitting photons with energies ranging from 315 nm to 1400 nm.

In another embodiment, the average particle size of the RBN is less than 10 μm, and the surface area of the RBN is greater than 30 $m^2/g$.

In another embodiment, the extended reactive vacancies are configured to reduce and anchor metal atoms and metal compounds in/on the reductive boron nitride lattice to form a metal nanostructure decorated RBN.

In another embodiment, the metal nanostructure decorated RBN includes an isolated single atom, few-atom clusters with an average size ranging from 175 μm to 1 nm, nanoparticles with an average size ranging from 1 nm to 500 nm, and any combination thereof.

In another embodiment, the metal atom is used in a catalytic application. The catalytic application includes a hydrogen evolution reaction, an oxygen evolution reaction, an oxygen reduction reaction, an acetylene cyclotrimerization, a HCHO oxidation, a methanol oxidation, a CO oxidation, $CO_2$ methanation, and a $CO_2$ reduction.

Another aspect of the present invention is directed to a method for making reductive boron nitride (RBN) with extended reactive vacancies. The method includes mechanical grinding of hexagonal boron nitride at a cryogenic temperature to create extended reactive vacancies.

In one embodiment, the grinding time is longer than 0 min.

In another embodiment, the cryogenic temperature is at or below 123 K.

In another embodiment, the mechanical grinding is conducted in containers with one or more movable impactors.

Another aspect of the present invention is directed to a method for making metal decorated reductive boron nitride (RBN) with extended reactive vacancies. The method includes a) mixing the RBN with extended reactive vacancies with a metal precursor in a polar or non-polar solvent or solvents at room temperature; b) washing away excess metal compounds with polar or non-polar solvent or solvents by centrifugation or filtration; and c) re-dispersing materials obtained from b) in polar or non-polar solvent or solvents. The obtained liquid suspensions can be used as is or as powders after evaporating the solvent or solvents.

In one embodiment, the metal is selected from all metals, and any combination thereof.

In another embodiment, the metals are in ionic form in the obtained liquid suspensions. In some embodiments the ionic form includes Ag+, Pt4+, or Au3+.

In another embodiment, the solvent or solvents of the obtained liquid suspension is selected from the group consisting of polar and non-polar solvents, and any combination thereof. In some embodiments the solvent includes ethanol, isopropanol, hexane, acetone, or combinations thereof.

Other aspects and advantages of the invention will be apparent from the following description, drawings and the appended claims.

DETAILED DESCRIPTION OF THE INVENTION

Definitions

Figure 1:
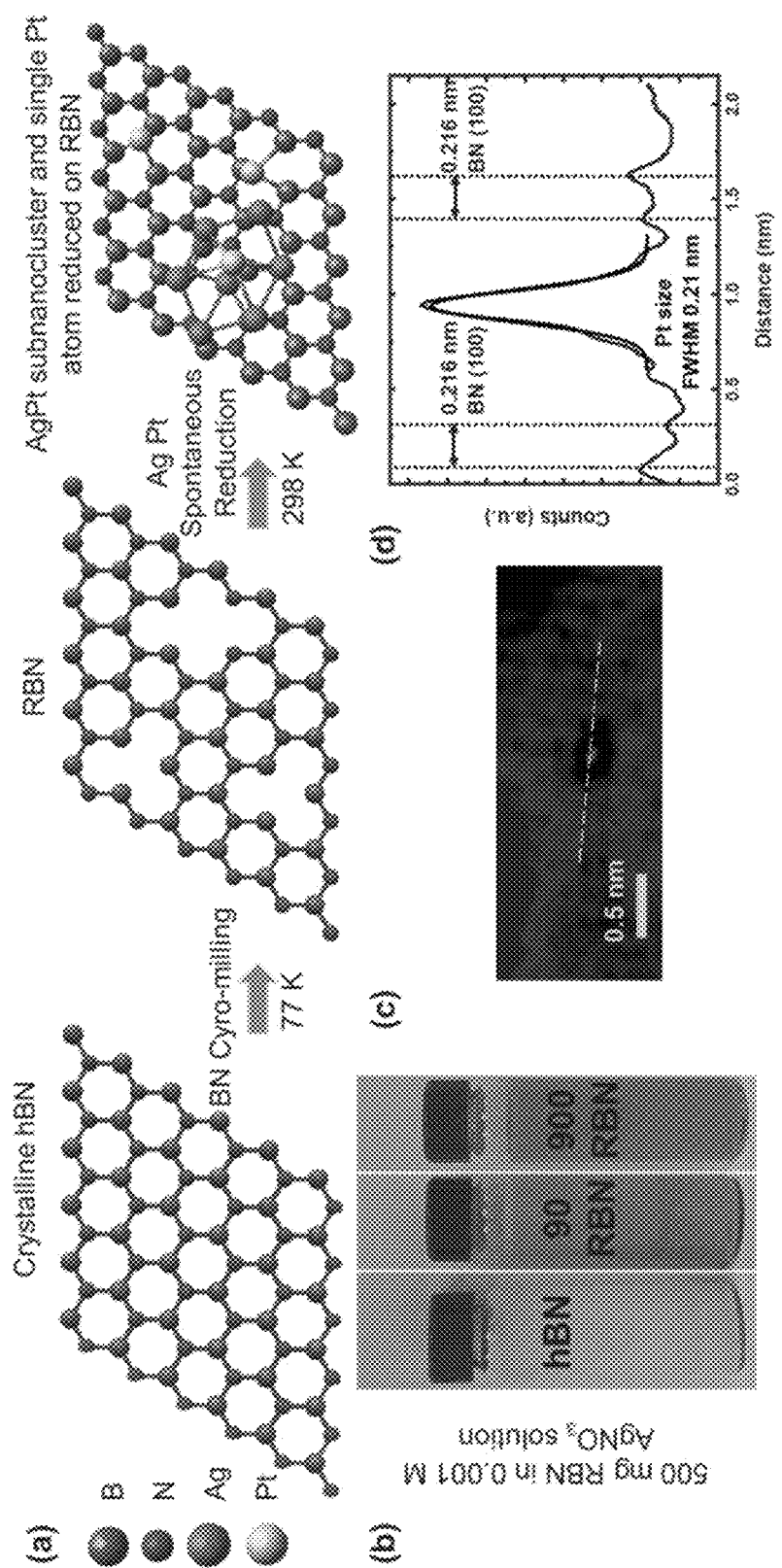
FIG. 1. (a) Schematic illustration of the synthesis of single atom Pt and few atoms AgPt clusters reduced on/by RBN. (b) The photograph of 500 mg hBN and RBN (90 and 900 min) after the reaction with 10 ml 0.001 M $AgNO_3$ aqueous solution at room temperature. (c) HAADF-STEM image of single Pt atom on 90RBN (90RBN-Pt) with higher magnification. (d) Line profile from the white dashed line in (c).

While the terms used herein are believed to be well understood by one of ordinary skill in the art, definitions are set forth herein to facilitate explanation of the subject matter disclosed herein.

Unless defined otherwise, all technical and scientific terms used herein have the same meaning as commonly understood by one of ordinary skill in the art to which the subject matter disclosed herein belongs. Although any methods, devices, and materials similar or equivalent to those described herein can be used in the practice or testing of the presently disclosed subject matter, representative methods, devices, and materials are described herein.

The terms "a," "an," and "the" refer to "one or more" when used in this application, including the claims. The use of the word "a" or "an" when used in conjunction with the term "comprising" in the claims and/or the specification may mean "one," but it is also consistent with the meaning of "one or more," "at least one," and "one or more than one."

All references to singular characteristics or limitations of the present disclosure shall include the corresponding plural characteristic(s) or limitation(s) and vice versa, unless otherwise specified or clearly implied to the contrary by the context in which the reference is made.

All combinations of method or process steps as used herein can be performed in any order, unless otherwise specified or clearly implied to the contrary by the context in which the referenced combination is made.

The methods and devices of the present disclosure, including components thereof, can comprise, consist of, or consist essentially of the essential elements and limitations of the embodiments described herein, as well as any additional or optional components or limitations described herein or otherwise useful.

Unless otherwise indicated, all numbers expressing physical dimensions, quantities of ingredients, properties such as reaction conditions, and so forth used in the specification and claims are to be understood as being modified in all instances by the term "about". Accordingly, unless indicated to the contrary, the numerical parameters set forth in this specification and claims are approximations that can vary depending upon the desired properties sought to be obtained by the presently disclosed subject matter.

As used herein, ranges can be expressed as from "about" one particular value, and/or to "about" another particular value. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

EXAMPLE 1

Reductive Boron Nitride with Spontaneously Reduced Pt/AgPt for HER Catalyst

In the present invention, two-dimensional (2D) boron nitride (BN) with mechanically activated defects was selected as an ideal support to spontaneously reduce Pt single atom and AgPt subnanoclusters. Although BN itself is rarely considered as a promising catalyst, its excellent chemical stability, high thermal conductivity, and large band gap of 5.5 eV make it a strong candidate as catalyst support under various harsh conditions (e.g., high temperature, acid, and base). By introducing defects such as vacancies and hetero-atoms, BN can be activated to reductive boron nitride (RBN) so that the optical bandgap is reduced, and various defect levels are created within the forbidden gap. An RBN is a defective hexagonal boron nitride with chemical reactive sites that are randomly distributed on the surface and are capable of reducing metal compounds to their lower oxidation states including but not limited to metallic clusters and single atoms.

To create defects, BN powders were cryo-milled at −196° C. for a certain time as shown in FIG. 1(a). A series of RBN with different cryo-milling time (90 and 900 min) were prepared. Then the reductive BN (RBN) was mixed with a various salt solution such as $AgNO_3$ aqueous solution at room temperature. Due to the reduction of Ag nanoparticles by RBN, the color of the powder is changed into blue in 90RBN and brown in 900RBN as shown in FIG. 1(b). Besides reducing Ag nanoparticles by RBN, atomically dispersed Pt atoms can also be spontaneously reduced by RBN, when the salt was changed $PtCl_4$. The line profile from the STEM image shown in FIG. 1(c-d) further confirms that single Pt atom with diameter 0.21 nm was reduced and embedded in BN lattice. Moreover, bimetallic AgPt sub-nanoclusters can also be reduced by RBN layer when switching the salt solution to the mixture of $AgNO_3$ and $PtCl_4$.

Figure 2:
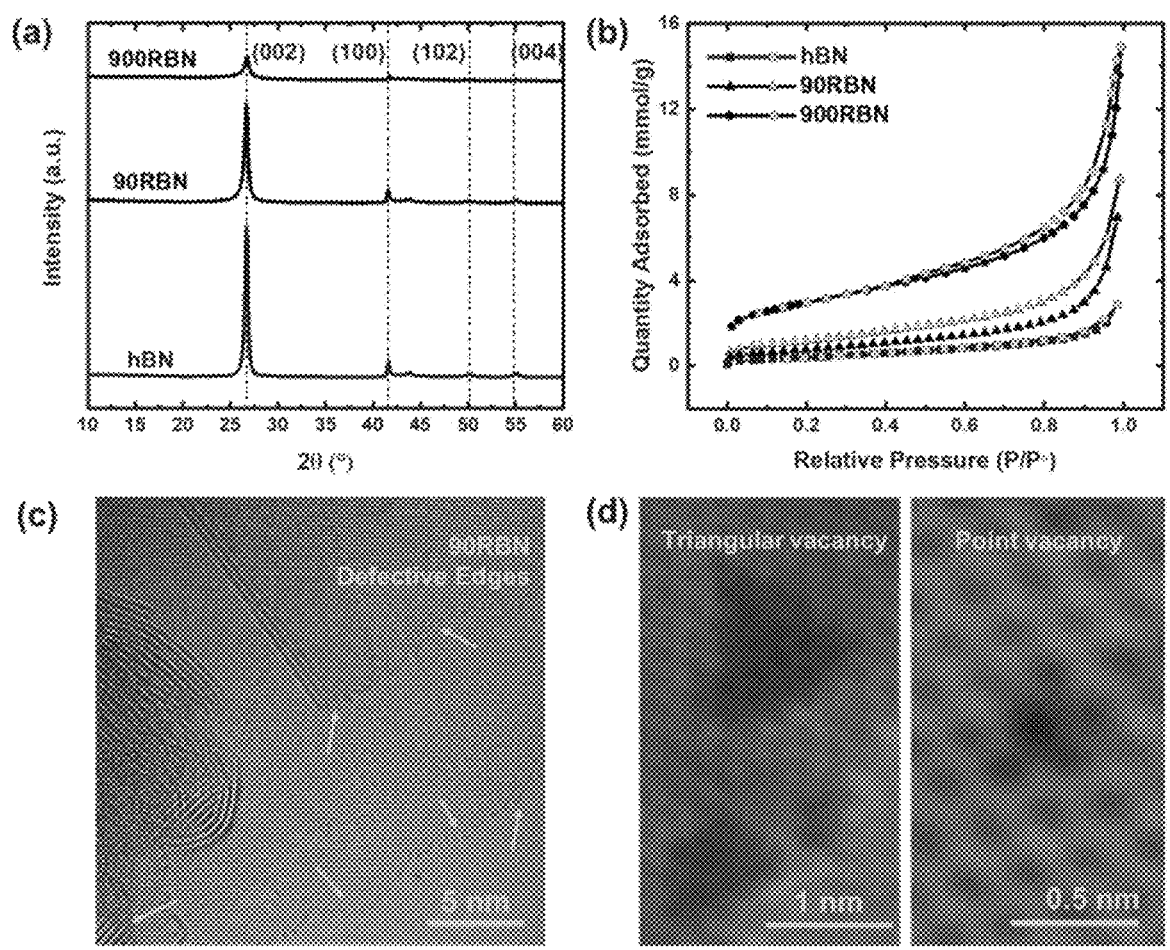
FIG. 2. (a) XRD spectra of hBN and RBN with different cryo-milling time (90 and 900 min). (b) $N_2$ adsorption and desorption isotherms of hBN, 90RBN, and 900RBN. (c-d) HRTEM image of the 90RBN, (c) showing the defects at the edges; (d) the triangular and point vacancies.

The reactivity from the RBN is attributed to the defects including edges and vacancies in RBN. The X-ray diffraction (XRD) in FIG. 2(a) shows a gradual disordering process when the cryo-milling time increases, as the BN (002) peak becomes weakened and broadened. As cryo-milling time increases, BN flakes were exfoliated by the shearing force from the milling, resulting in the decrease in the grain size and the particle size. Thus, more surfaces and edges were exposed, giving rise to the increase in the surface area. The $N_2$ sorption isotherms of the Hbn and RBN (90RBN and 900RBN) shown in FIG. 2(b) are classified as type II, indicating macropore solids, which is similar as that of exfoliated graphite. As cryo-milling time increases, the Brunauer-Emmer-Teller (BET) surface area and total pore volume increase from 37 $m^2$ $g^{-1}$ and 100 $mm^3$ $g^{-1}$ in hBN to 234 $m^2$ $g^{-1}$ and 516 $mm^3$ $g^{-1}$ in 900RBN, respectively. Besides the exposure of surfaces and edges via the exfoliation and the formation of smaller particles, the impact of milling also results in disordered structures, including exposed edges (FIG. 2(c)), and vacancies (point and triangular vacancies, FIG. 2(d)).

Figure 3:
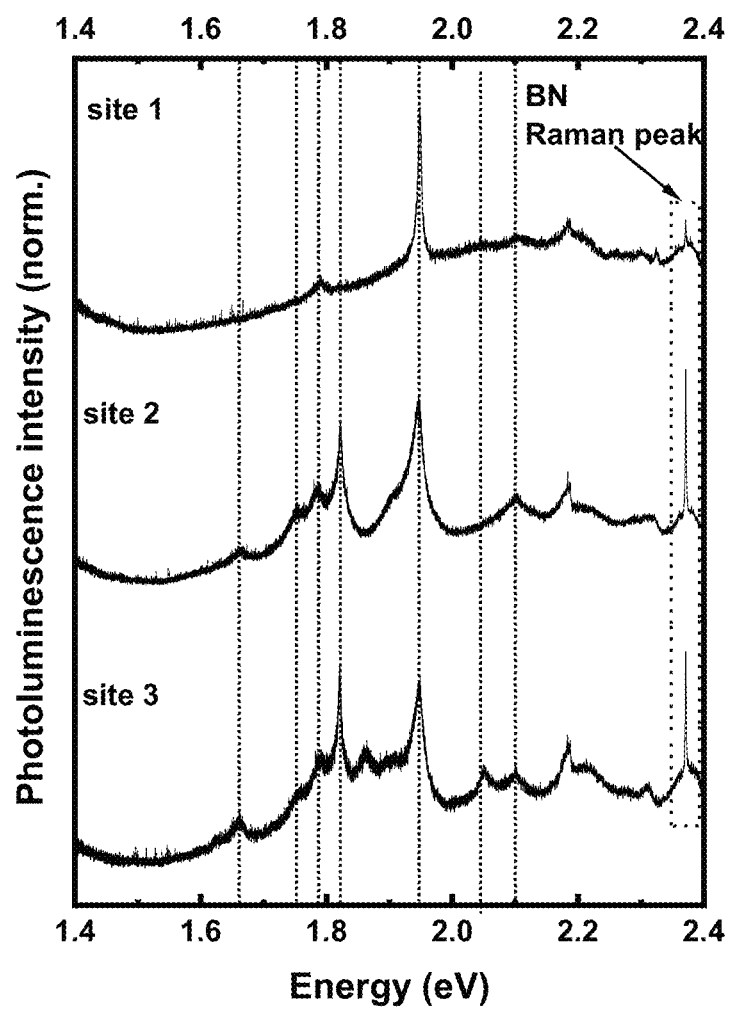
FIG. 3. Room-temperature photoluminescence spectra of 90RBN at 3 different sites with a 488 nm excitation laser. Emissions at 1.66, 1.75, 1.79, 1.82, 1.95, 2.05, and 2.10 eV can be found.

The introduced vacancies are also responsible for the created defect levels between the valence and conduction band of BN, giving rise to various photon emissions ranging from 1.59 to 2.19 $eV^2$. Room temperature photoluminescence spectra of 90RBN collected from 3 sites shown in FIG. 3 reveal the emissions at 1.66, 1.79, 1.82, 1.95, 2.05, and 2.10 eV. Among those, the most intense emission is at 1.95 eV in all three sites, and previous work has revealed that this emission is associated with the presence of nitrogen-vacancy along with a substitution of nitrogen at the boron site. The created defect states also enable the charge transfer between the defective BN and the cations from the aqueous solution, so that Ag and Pt can be spontaneously reduced on the defective sites.

Figure 4:
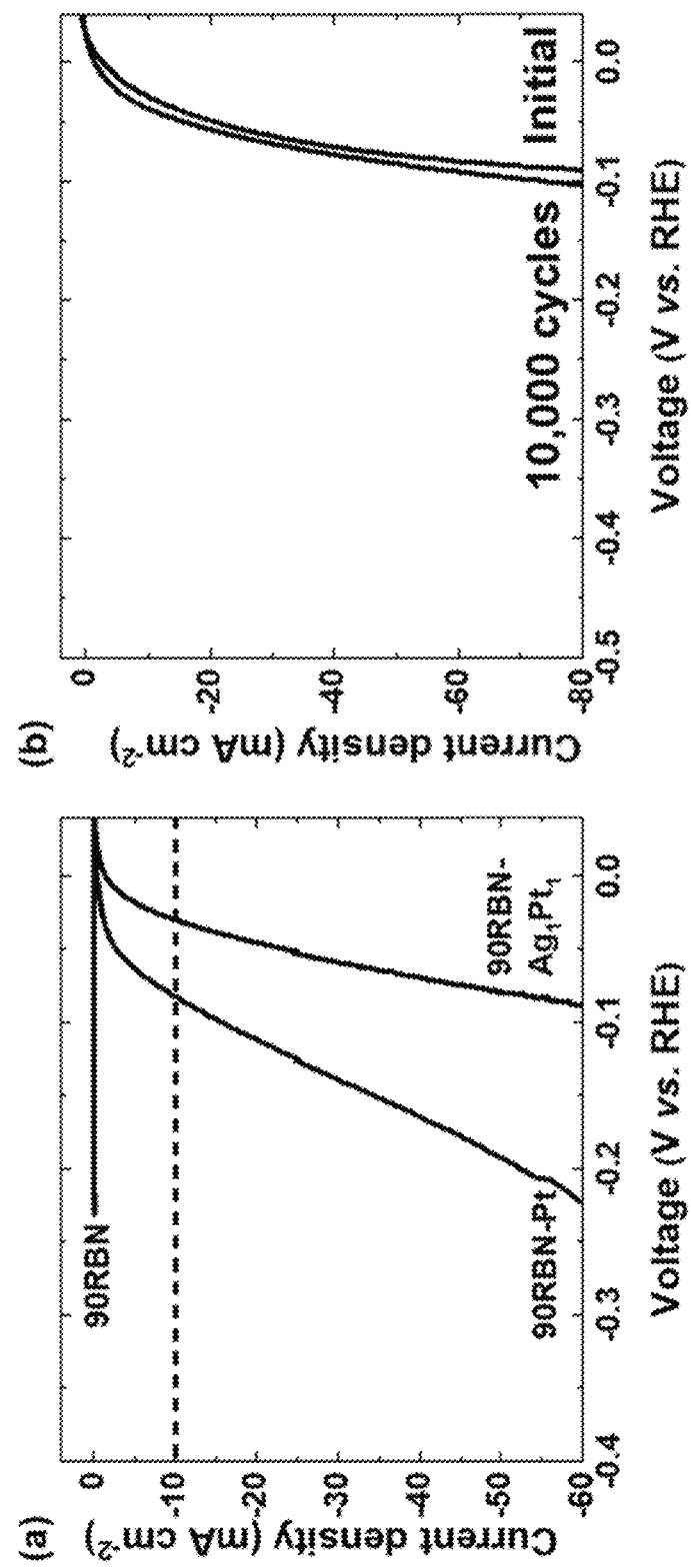
FIG. 4. (a) The HER polarization curves of 90RBN, 90RBN-Pt and 90RBN-$Ag_1Pt_1$. (b) Durability measurement of the 90RBN-$Ag_1Pt_1$. The polarization curves were recorded at the 1st cycle and after 10,000 cycles.

By reducing atomically dispersed Pt atoms and AgPt subnanoclusters on RBN, the compounds can be used as the catalyst for hydrogen evolution reaction (HER). The HER performance of RBN with atomically dispersed Pt and AgPt subnanoclusters ($Ag_1Pt_1$) was investigated in a 0.5 M $H_2SO_4$ solution. For an efficient HER catalyst, a high turn-over frequency (TOF) and exchange current, and a low Tafel slope and onset potential are needed. The 90RBN (shown in FIG. 4(a)) exhibits negligible performance compared to the electrodes with Pt, indicating that only the atomically dispersed Pt atoms are HER active. In 90RBN-Pt where Pt atoms are atomically dispersed on BN, the onset potential is 82.5 mV that is comparable to commercialized Pt/C, and the Tafel slope is 51.4 mV $dec^{-1}$. Normally, the HER on Pt surface undergoes the Volmer-Tafel reaction such that the rate-limiting step is the recombination step. However, in 90RBN-Pt, since single Pt atoms are isolated by inert BN, the recombination of chemisorbed hydrogen atoms becomes sluggish, resulting in a relatively higher Tafel slope in 90RBN-Pt compared to that of commercialized Pt/C. The HER performance can be improved by forming bimetallic AgPt subnanoclusters. When the Ag to Pt molar ratio is 1 to 1 (90RBN-$Ag_1Pt_1$), the best HER performance can be achieved with an onset potential of 30.2 mV and a Tafel slope of 33.2 mV $dec^{-1}$. The exchange current of atomically dispersed Pt is 2 to 3 times higher than that of Pt in bulk form. TOF and exchange current reveal the intrinsic electrocatalytic activity per Pt atoms and the rate of hydrogen evolution per surface area at equilibrium, respectively. Hence, the improvements in TOFs and exchange current over Pt-based SACs further imply that the single atom catalyst (SAC) is designed to maximize the utilization of each metal atom which is counted as the active site, resulting in cost efficiency. The lifetime of the best performing catalyst 90RBN-$Ag_1Pt_1$ was evaluated in FIG. 4(b). FIG. 4(b) demonstrates that after 10,000 cycles the performance is comparable to that of the 1st cycle, indicating that AgPt clusters are robustly anchored on defective BN.

EXAMPLE 2

Other Metal Reduction Using Reductive Boron Nitride (RBN)

Figure 5:
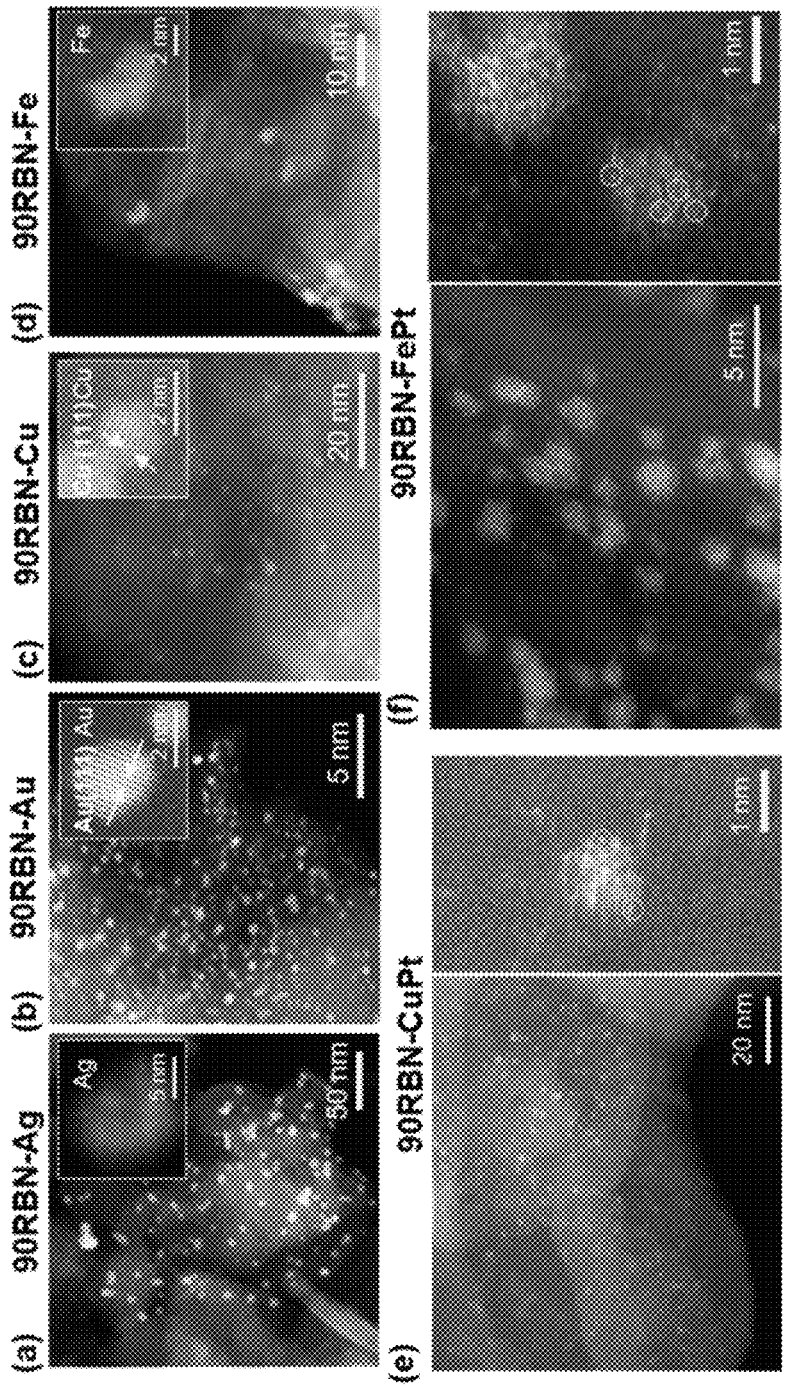
FIG. 5 HRSTEM images of (a) 90RBN-Ag, (b) 90RBN-Au, (c) 90RBN-Cu, (d) 90RBN-Fe, (e) 90RBN-CuPt, and (f) 90RBN-FePt.

To reduce other metals, RBN powders were mixed with different aqueous solutions of metal precursors to reduce different metals into single atom and/or nanoclusters. In particular, 90RBN were mixed with $AgNO_3$, $FeCl_3$, $CuSO_4$, and $HAuCl_4$ to obtain Ag, Fe, Cu, and Au, respectively. As seen in FIG. 5, part (a), Ag were reduced into ~8 nm nanoparticles on RBN. Similar trends are observed for reductions of Au, Cu, and Fe (FIG. 5, parts (b-d)). For Au, Cu, and Fe reduction; nanoclusters were formed with diameters ranging from 2-4 nm were identified by STEM (FIG. 5, parts (b-d)). In addition, bi-metallic nanoclusters, CuPt (FIG. 5 part (e)) and FePt (FIG. 5, part (f)), with atomically dispersed Pt atoms can also be reduced on 90RBN by mixing the precursors of Cu or Fe with Pt. The bi-metallic nanoclusters have the potential to work as the co-catalyst for reaction involving different reactants.

Figure 6:
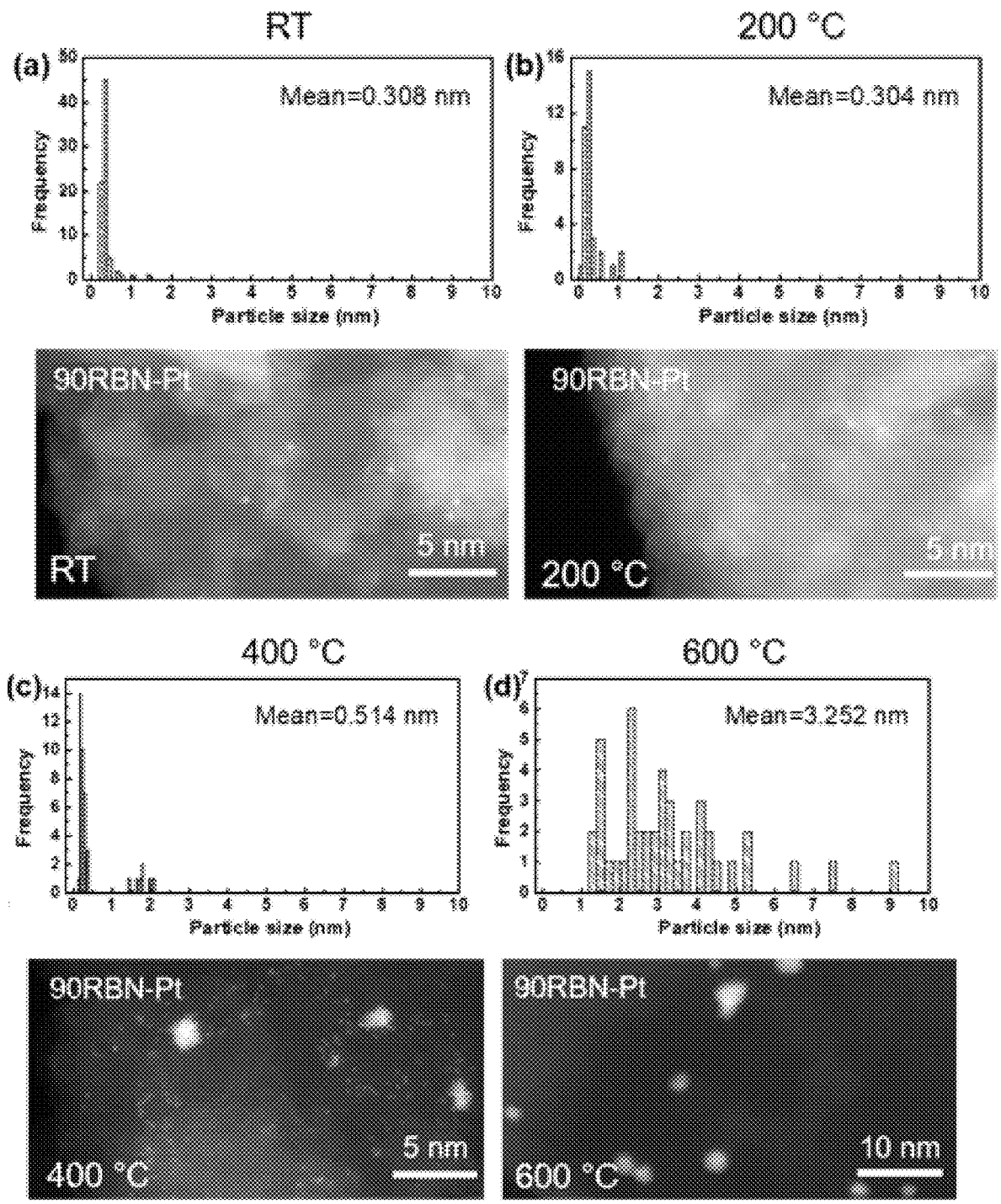
FIG. 6. Thermal stability of 90RBN-Pt. Pt particle size distributions (up) and STEM images (down) of 90BN-Pt treated at different temperature in air. (a) room temperature, RT; (b) 200° C.; (c) 400° C.; (d) 600° C.

An advantage of using RBN as the metal support is that metals are reduced and confined at the vacancy sites, while the non-defect region still takes the advantage of the inert and thermally stable hBN. Ex-situ STEM experiments and statistical analysis were conducted using 90RBN-Pt with annealing temperature ranging from room temperature to 600° C. The majority of Pt atoms are single atoms until 200° C. (FIG. 6, parts (a, b)). Surprisingly, when the annealing temperature reached 400° C., more than 90% of the Pt atoms are still single atoms, although Pt atoms start to migrate and form larger particles (FIG. 6, part(c)). Only when the temperature reached 600° C., the majority of the Pt atoms coalesced into larger nanoparticles with an average diameter of 3.3 nm (FIG. 6, part (d)). Therefore, the formation of metal/RBN architectures at room temperature provides economical and scalable routes to synthesize thermally stable single metal catalysts (SAC) up to 400° C.

Figure 7A:
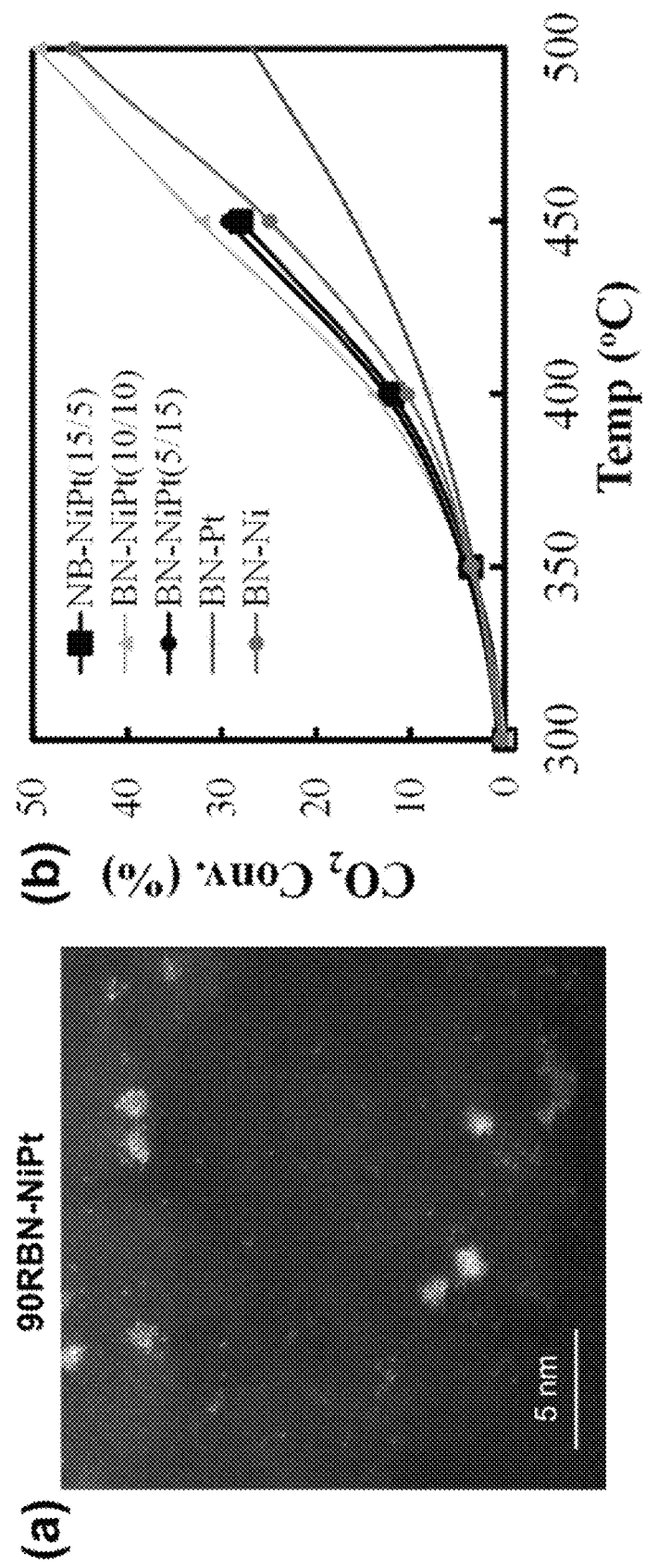
FIG. 7A. (a) HRSTEM images of RBN-NiPt; (b) $CO_2$ conversion rate at different temperature with RBN-metal catalysts for the $CO_2$ methanation reaction.

Due to the capability of reducing metal ions into nanostructures and the thermal stability to avoid metal aggregation, the RBN-metal composites can be further used as the high temperature catalyst, such as $CO_2$ methanation. As seen in FIG. 7A, part (a), RBN-NiPt with atomically dispersed Pt atoms and ~2 nm Ni clusters were reduced on RBN. By varying the ratio of NiPt, RBN-NiPt shows varied performance in converting $CO_2$ into $CH_4$. As seen in FIG. 7A, part (b), when the NiPt ratio is 1:1, the catalyst has the highest $CO_2$ conversion rate of 50% at 500° C. These results further confirmed the possibility in using RBN-metal for high temperature (>100° C.) catalysts.

Figure 7B:
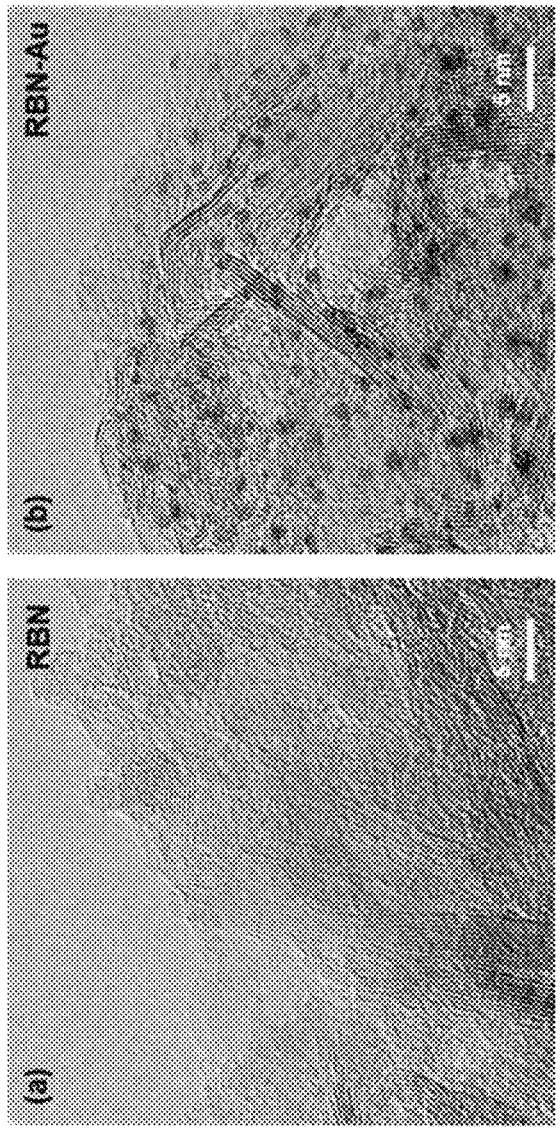
FIG. 7B. HRTEM images of (a) RBN and (b) RBN-Au.

FIG. 7B shows results of a trial involving spontaneous reduction of Au nanoparticles on RBN, in which a Au(I) solution was first prepared by mixing 0.5 mL 0.01 M Au(III) tetrachloroaurate with 50 µL 0.005 M ascorbic acid and 9.45 mL DI water to form a colorless solution. Then, RBN was added into the prepared Au(I) solution. After a 10 min stirring, the solids were separated by centrifugation, followed by DI water washing and drying. The dried powder was characterized by high-resolution transmission electron microscopy (HRTEM). As shown in FIG. 7B, Au particles with a diameter ~2-3 nm were spontaneously reduced on RBN, especially on the defective sites.

EXAMPLE 3

Defective $WS_2$ Via Cryo-Milling $WS_2$ (2 µm, 99%, Sigma-Aldrich) was milled in a solid state at a cryogenic temperature (~77.2 K) in a cryogenic mill SPEX 6770 Freezer/Mill. The cryogenic grinding process consisted of an oscillating steel impactor within a plastic vial, immersed in liquid nitrogen. Prior to the grinding process, each sample was pre-cooled for 10 minutes, and then cryo-milled with different time/cycles (10. 30. 45 min). Each milling cycle corresponds to 3 min grinding followed by 2 min of cooling.

Figure 8:
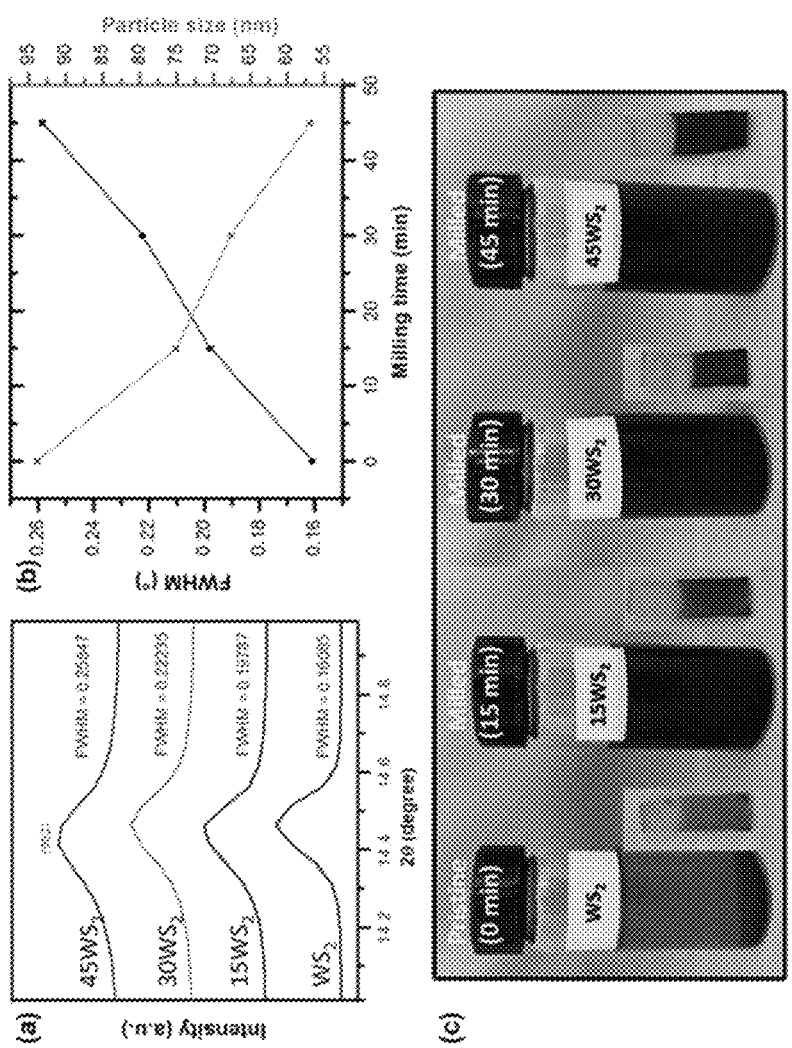
FIG. 8. (a) XRD diffraction pattern for the pristine $WS_2$ and $WS_2$ cryomilled samples. (b) $WS_2$ particle size calculated by Scherrer equation. (c) $WS_2$ dispersions in acetone prepared with the pristine $WS_2$, and with the cryomilled samples for 15, 30, and 45 min after 2 h of sonication (0.8 mg/mL). At the right of each sample is the corresponding $WS_2$ film deposited on a FTO electrode.

After cryomilling, the samples were characterized by XRD. In FIG. 8(a) is shown an analysis of (002) peak, where the full width at half maximum (FWHM) of the normalized peak for the four samples was calculated. The peak area decrement for the longer cryomilled samples is related to the lattice deformation caused by atomic defects such as vacancies, dislocations, interstitial or substitutional atoms, and other defects caused by the cryomilling process. FIG. 8(b) presents the particle size obtained from calculations by the Scherrer equation and the corresponding FWHM (°) and milling time. The values indicate that cryomilling $WS_2$ powder for 45 min reduces approximately 40% its particle size.

Due to the lattice deformation and grain size reduction, cryo-milled $WS_2$ is easier to be dispersed in solution. Acetone dispersions of pristine $WS_2$, $15WS_2$, $30WS_2$ and $45WS_2$ (0.8 mg/mL) were prepared from the cryomilled powder by placing them under sonication for two hours and then pouring them into a 6 $cm^3$ cell leaving an electrode gap of 1 cm. The electrophoretic deposition was carried out by applying 60 V using a 2400 Keithley sourcemeter between two cleaned FTO on glass electrodes for 30 sec. The dispersions prepared with the samples milled for 15, 30 and 45 min have a difference in colloidal stability as compared to the dispersion prepared with pristine $WS_2$. It is expected that, as the particle size decreases, the contribution of the Brownian motion plays a more important role in providing colloidal stability. FIG. 8(c) shows the resultant electrode after the electrophoretic deposition. The films show homogeneous deposition covering the substrate.

EXAMPLE 4

Defective $MoS_2$ Via Cryo-Milling

Figure 9:
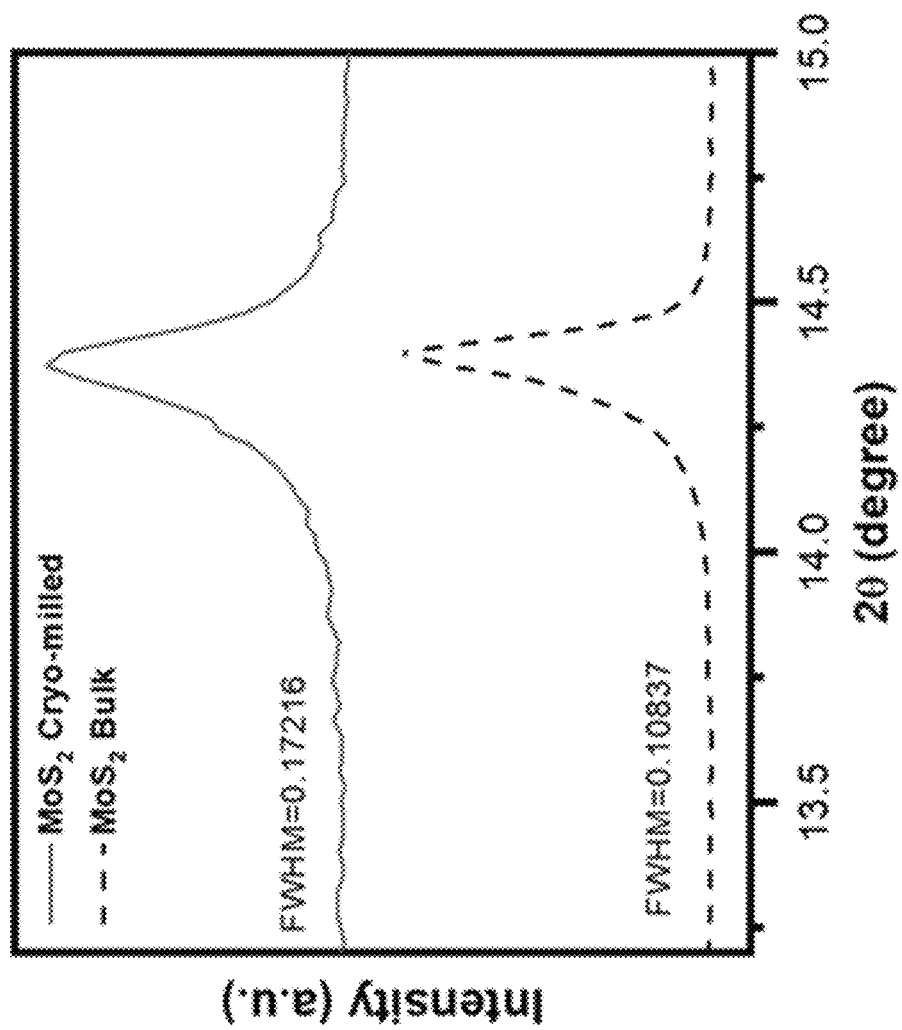
FIG. 9. XRD diffraction pattern for the pristine $MoS_2$ and $MoS_2$ cryomilled samples.
Figure 14:
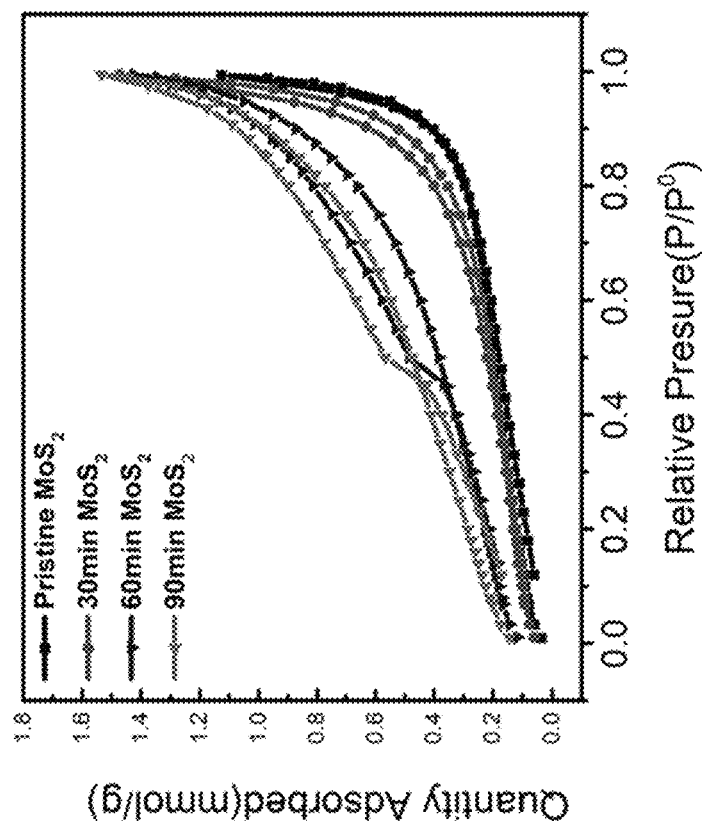

Molybdenum disulfide ($MoS_2$) is a layered semiconductive transition metal dichalcogenide (TMD). The XRD pattern of pristine $MoS_2$ is characteristic for the hexagonal with the highest intensity reflection peak at d=6.16 Å (002) as disclosed in FIG. 9. After cryo-milling, no obvious phase change can be obtained, but defects, edges, and more exposed area are created in $MoS_2$. After a 45 min cryomilling, the grain size of $MoS_2$ decreased to 48.6 nm from 77.2 nm in pristine $MoS_2$. As shown in FIG. 14 cryo-milling time increases, the BET surface area and total pore volume increase from 10.9 $m^2$/g and 38.2 $mm^3$/g in pristine $MoS_2$ to 24.8567 $m^2$/g and 52.5 $mm^3$ $g^{-1}$ in 90 min $MoS_2$, respectively. Due to the created defects, edges, and exposed edges, more dangling bonds are exposed as the reactive centers for molecular adsorption.

EXAMPLE 5

Defective Graphite Via Cryo-Milling

Figure 10:
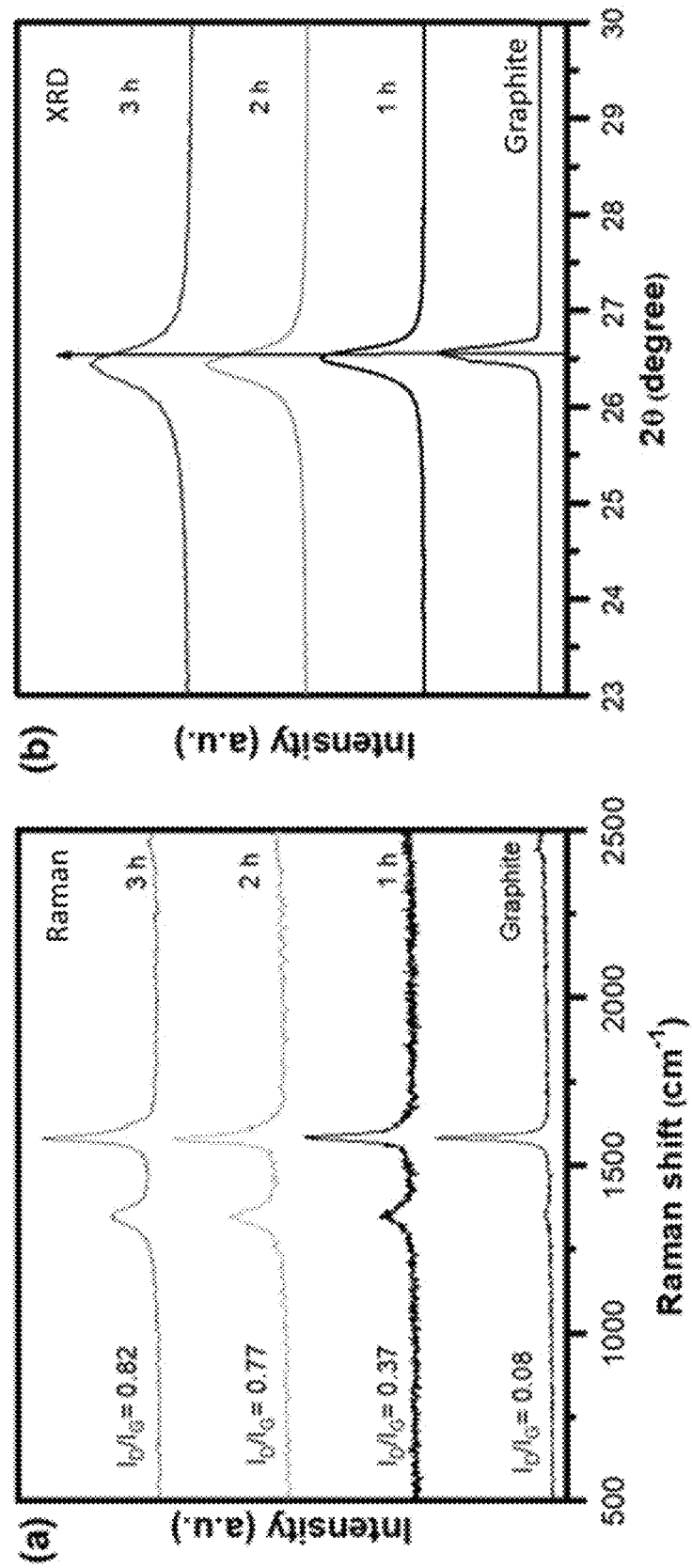
FIG. 10. (a) Raman spectra and the (b) XRD diffraction pattern of graphite, 1 h, 2 h, and 3 h cryo-milled graphite.

Graphite is a layered conducting material. Similar to BN, $WS_2$, and $MoS_2$, defects, edges, and exposed surfaces can be obtained by cryo-milling. As disclosed in FIG. 10(a), $I_D/I_G$ gradually increases as cryo-milling time increase, indicating an increased amount of the induced structural disorder via cryo-milling. The gradual shifts in 002 peak (see FIG. 10(b)) as cryo-milling time increases suggests the expanded layer distance after cryo-milling.

EXAMPLE 6

Defective Graphite Via Cryo-Milling

Figure 11:
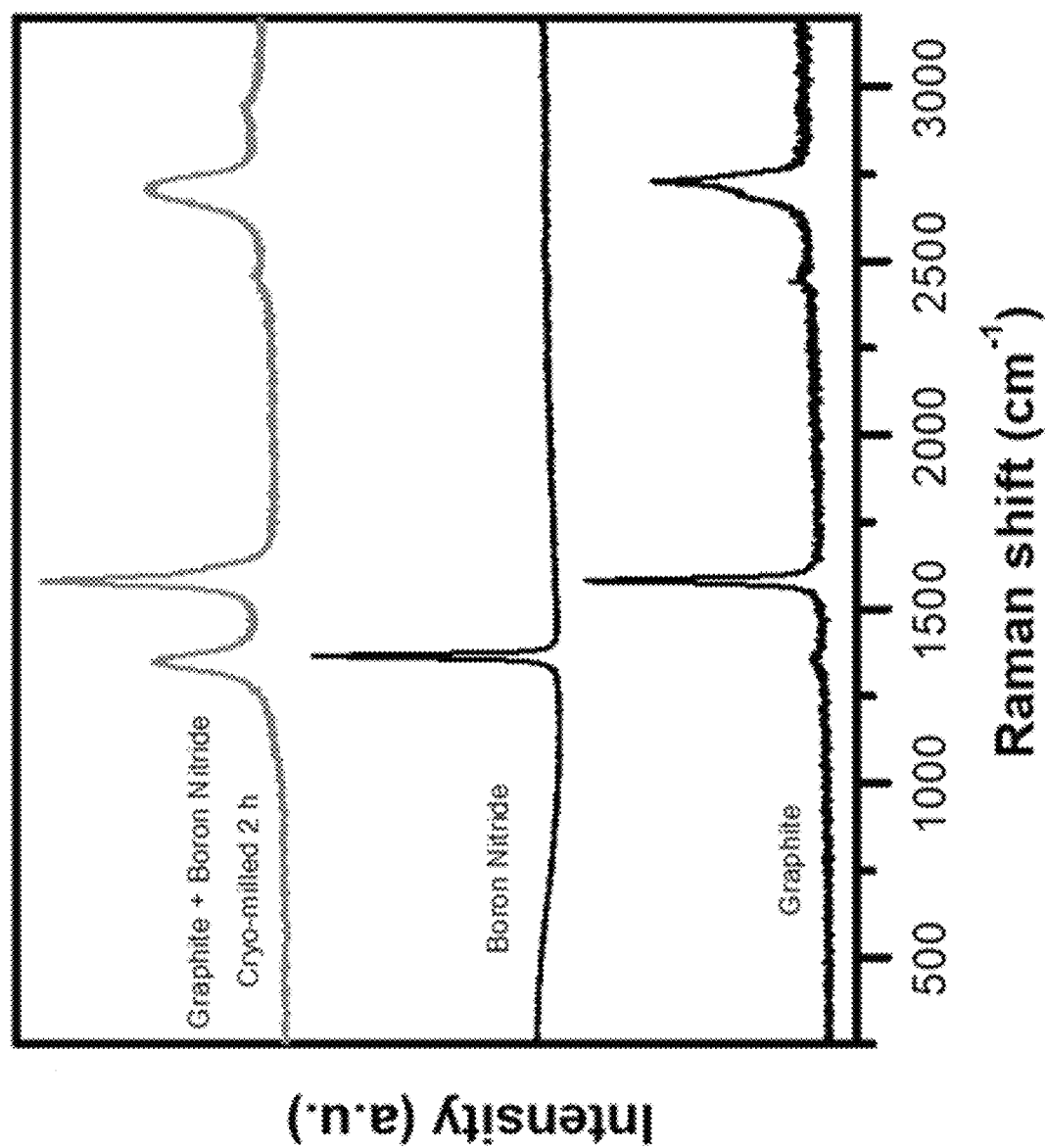
FIG. 11. Raman spectra of graphite, boron nitride, and graphite/BN mixture after 2 h cryo-milling.

The method can also be extended to the mixture of different 2D materials, for example, graphite and boron nitride mixture. Boron nitride and graphite were mixed before the cryo-milling. After 2 h cryo-milling, the mixture was well mixed, and defects were created. As disclosed in FIG. 11, Raman indicates the coexistence of boron nitride and graphite. In addition, the peak broadening implies that defects are presented in the mixture after the 2 h cryo-milling.

Although the present invention has been described in terms of specific exemplary embodiments and examples, it will be appreciated that the embodiments disclosed herein are for illustrative purposes only and various modifications and alterations might be made by those skilled in the art without departing from the spirit and scope of the invention as set forth in the following claims.

Documents reported herein are incorporated by reference in their entirety and do not carry an admission that they are prior art for any purpose. Where information specifically stated in this specification can be construed to contradict anything in the incorporated material, the information specifically stated in this specification shall control.

EXAMPLE 7

Defective MoS$_2$ and WS$_2$ Mixture Via Cryo-Milling for HER Catalyst

Figure 12:
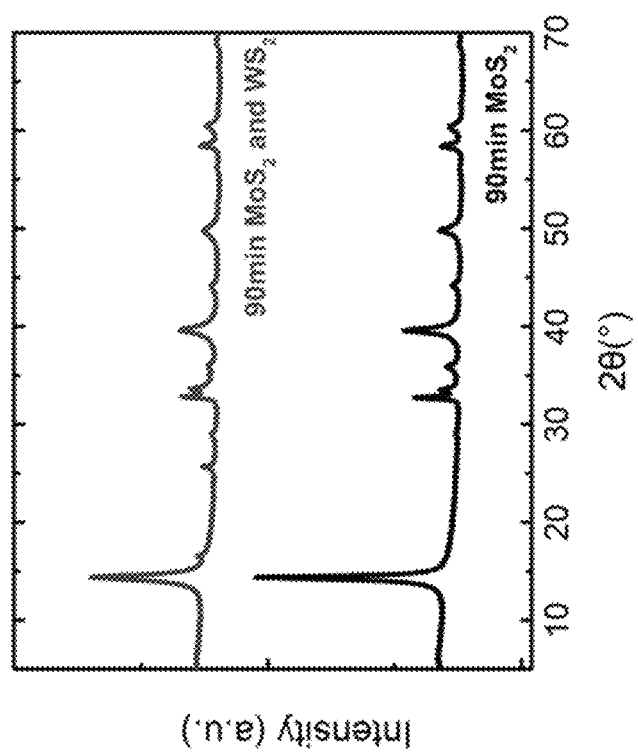
FIG. 12. XRD diffraction pattern for cryomilled $MoS_2$ and cryomilled $MoS_2/WS_2$ mixture FIG. 13. Raman spectra of cryomilled $MoS_2$ and cryomilled $MoS_2/WS_2$ mixture FIG. 14. $N_2$ adsorption and desorption isotherms of pristine and cryomilled $MoS_2$ FIG. 15. HRTEM images of cryomilled $MoS_2/WS_2$ mixture FIG. 16. (a) The HER polarization curves of cryomilled $MoS_2/WS_2$ mixture. (b) Tafel slope of cryomilled $MoS_2/WS_2$ mixture. (c) The HER polarization curves of cryomilled $MoS_2/WS_2$ mixture with Pt functionalization. (d) Tafel slope of cryomilled $MoS_2/WS_2$ mixture Pt functionalization.
Figure 13:
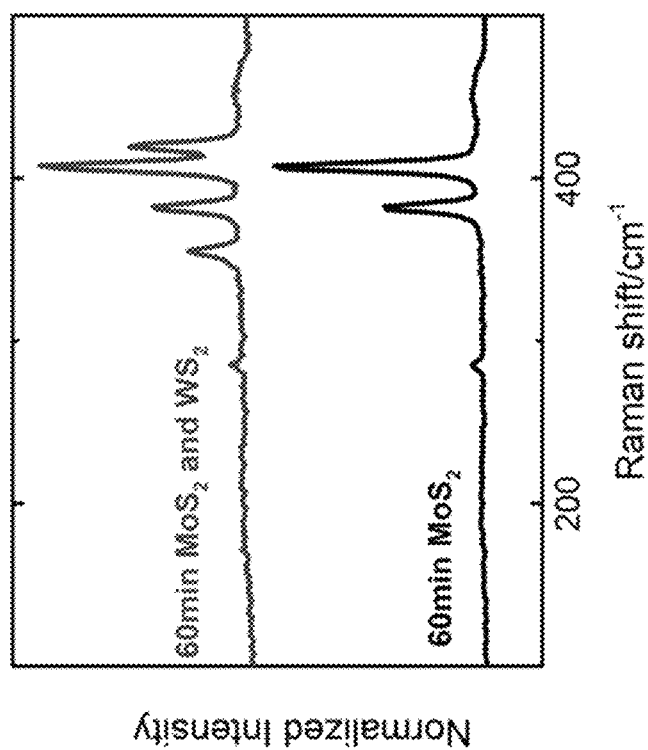
Figure 15:
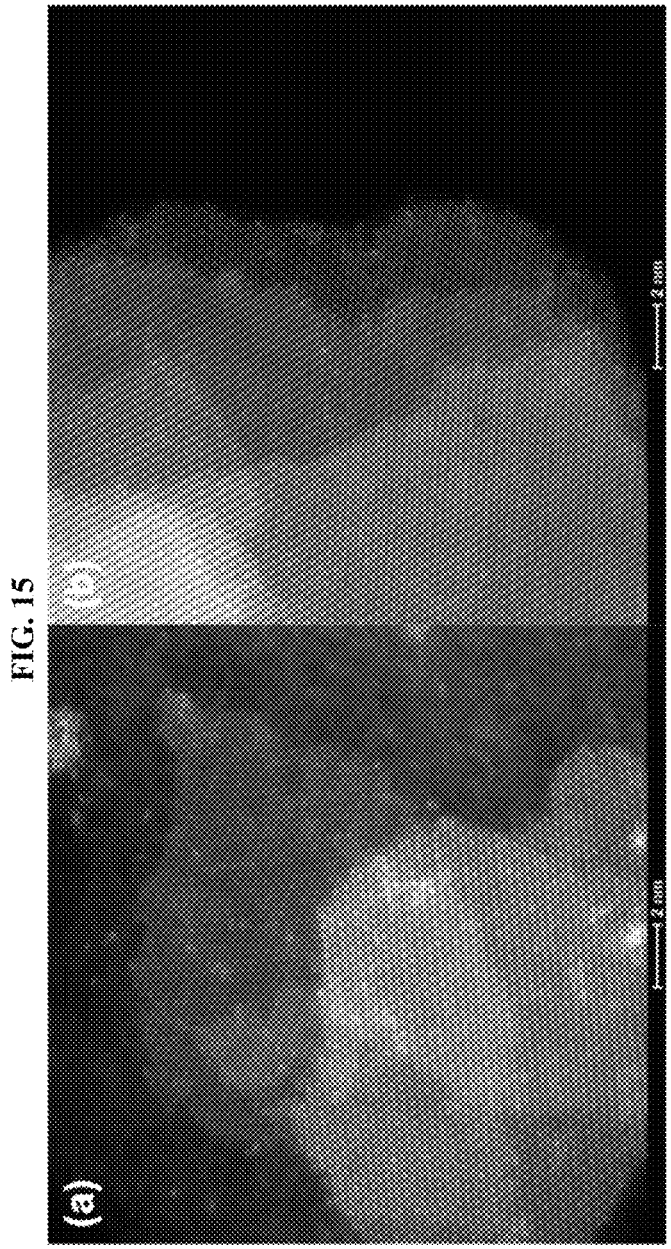
Figure 16:
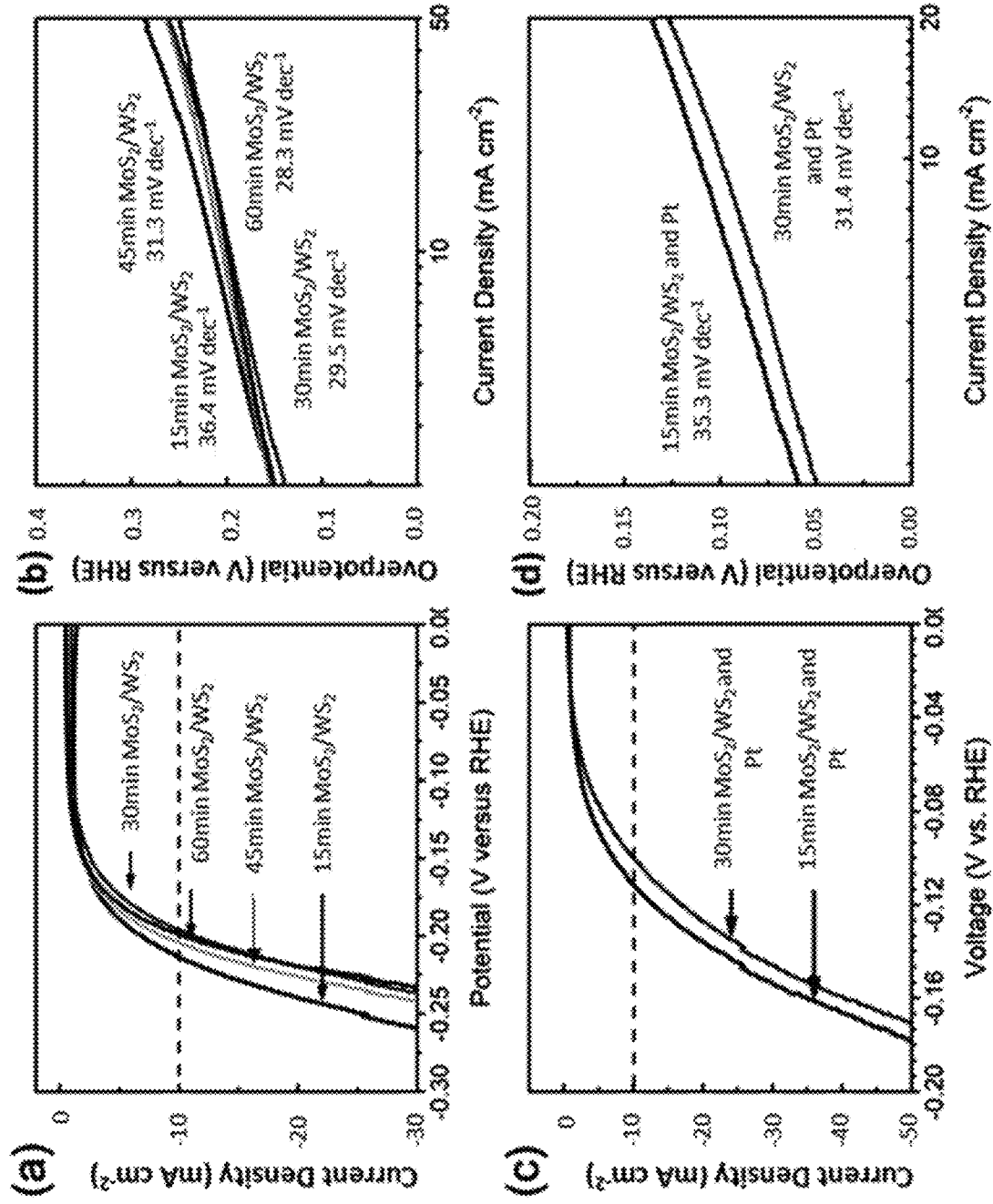

MoS$_2$ and WS$_2$ powders were also cryomilled together to form defective MoS$_2$ and WS$_2$ mixture. After 15-60 min cryo-milling, the powders were well mixed and defective. As seen in FIG. 15, many step edges and defective sites are formed after 60 min cryo-milling. Raman spectra was also applied to study the mixture and FIG. 13 shows the co-existence of both MoS$_2$ and WS$_2$. Similar effect is also shown on the XRD spectra of MoS$_2$/WS$_2$ mixture shown in FIG. 12. The defective sites in the mixture has also led to the enhanced HER catalytic performance. FIGS. 16 (a) and (b) shows the onset potential and Tafel slope of the cryo-milled mixture. The cryo-milling has also increased the chemical reactivity of the mixture which enables the mixture to spontaneous reduce PtCl$_4$ into Pt clusters which shows enhanced HER performances shown in FIGS. 16 (c) and (d).

What is claimed is:

1. A reductive boron nitride (RBN), wherein the RBN is a defective hexagonal boron nitride with chemical reactive sites that are randomly distributed on its surface, wherein the chemical reactive sites are configured for reducing metal compounds or single metal atoms to their lower oxidation states, and wherein the chemical reactive sites are formed by mechanical grinding at a cryogenic temperature.

2. The RBN of claim 1, wherein the metal compounds and single metal atoms comprise Pt, Au, Ag, Pd, Fe, Co, and Ni, and any combination thereof.

3. The RBN of claim 1, wherein the chemical reactive sites are lattice imperfections.

4. The RBN of claim 3, wherein the lattice imperfections are extended reactive vacancies or reactive edges.

5. The RBN of claim 1, wherein the chemical reactive sites have reactive edges, and wherein the average lateral size of the reactive edges is from 400 pm to 10 micrometers.

6. The RBN of claim 1, wherein the chemical reactive sites have extended reactive vacancies, and wherein the average diameter of the extended reactive vacancies is from 170 pm to 50 nm.

7. The RBN of claim 1, wherein the chemical reactive sites have extended reactive vacancies, and wherein the extended reactive vacancies are configured for reduction of the bandgap of the hexagonal boron nitride (hBN) from insulating boron nitride (BN) to semiconducting RBN.

8. The RBN of claim 7, wherein the bandgap of the insulating BN is from 5 to 6 eV, and the bandgap of the semiconducting RBN is from 0.1 to 4.99 eV.

9. The RBN of claim 1, wherein the chemical reactive sites have extended reactive vacancies, and wherein the extended reactive vacancies are configured for emitting photons with energies ranging from 315 nm to 1400 nm.

10. The RBN of claim 1, wherein the average particle size of the RBN is less than 10 μm, and the surface area of the RBN is greater than 30 m$^2$/g.

11. The RBN of claim 1, wherein the chemical reactive sites have extended reactive vacancies, wherein the extended reactive vacancies are configured to reduce and anchor metal atoms and metal compounds in/on a RBN lattice to form a metal nanostructure decorated RBN.

12. The RBN of claim 11, wherein the metal nanostructure decorated RBN comprises an isolated single atom, few-atom clusters with an average size ranging from 175 pm to 1 nm, nanoparticles with an average size ranging from 1 nm to 500 nm, and any combination thereof.

13. The RBN of claim 11, wherein the metal atoms are used in a catalytic application, wherein the catalytic application comprises a hydrogen evolution reaction, an oxygen evolution reaction, an oxygen reduction reaction, an acetylene cyclotrimerization, a HCHO oxidation, a methanol oxidation, a CO oxidation, CO$_2$ methanation, and a CO$_2$ reduction.

14. A method for making a reductive boron nitride (RBN) with extended reactive vacancies comprising mechanical grinding of hexagonal boron nitride at a cryogenic temperature to create extended reactive vacancies.

15. The method of claim 14, wherein the grinding time is longer than 0 min.

16. The method of claim 14, wherein the cryogenic temperature is at or below 123 K.

17. The method of claim 14, wherein the mechanical grinding is conducted in containers with one or more movable impactors.

18. A method for making metal nanostructure decorated reductive boron nitride (RBN) comprising in liquid suspension:
   a) mixing RBN, wherein the RBN comprises extended reactive vacancies formed by mechanical grinding of hexagonal boron nitride at a cryogenic temperature, with a metal precursor in a polar or non-polar solvent or solvents at room temperature to create a RBN with metal atoms and/or metal compounds anchored in the extended reactive vacancies;
   b) washing away excess metal compounds with polar or non-polar solvent or solvents by centrifugation or filtration; and
   c) re-dispersing materials obtained from b) in polar or non-polar solvent or solvents to obtain liquid.

19. The method of claim 18, wherein the metal precursor is selected from the group consisting of AgNO$_3$, FeCl$_4$, CuSO$_4$, HAuCl$_4$ and any combination thereof.

20. The method of claim 18, wherein the metal atoms are in ionic form, and wherein the ionic form comprises $Ag^+$, $Pt^{4+}$, and $Au^{3+}$.

21. The method of claim 18, wherein the solvent of the obtained liquid suspension is selected from the group consisting of ethanol, isopropanol, hexane, acetone, and any combination thereof.

\* \* \* \* \*